United States Patent
Wang

(10) Patent No.: US 10,658,122 B2
(45) Date of Patent: May 19, 2020

(54) CAPACITOR PACKAGE STRUCTURE WITH FUNCTIONAL COATING AND METHOD FOR MANUFACTURING THE SAME

(71) Applicant: APAQ TECHNOLOGY CO., LTD., Miaoli County (TW)

(72) Inventor: Yi-Ying Wang, Hsinchu (TW)

(73) Assignee: APAQ TECHNOLOGY CO., LTD., Miaoli County (TW)

( * ) Notice: Subject to any disclaimer, the term of this patent is extended or adjusted under 35 U.S.C. 154(b) by 78 days.

(21) Appl. No.: 15/856,125

(22) Filed: Dec. 28, 2017

(65) Prior Publication Data
US 2019/0198253 A1    Jun. 27, 2019

(30) Foreign Application Priority Data
Dec. 25, 2017   (TW) .............................. 106145555 A

(51) Int. Cl.
| | | |
|---|---|---|
| *H01G 9/025* | (2006.01) | |
| *H01G 9/15* | (2006.01) | |
| *H01G 9/028* | (2006.01) | |
| *H01G 9/00* | (2006.01) | |
| *B05D 7/00* | (2006.01) | |
| *B05D 5/12* | (2006.01) | |
| *H01G 9/10* | (2006.01) | |

(52) U.S. Cl.
CPC .............. *H01G 9/028* (2013.01); *B05D 5/12* (2013.01); *B05D 7/544* (2013.01); *H01G 9/0036* (2013.01); *H01G 9/151* (2013.01); *B05D 2518/10* (2013.01); *H01G 9/10* (2013.01)

(58) Field of Classification Search
CPC .......... H01G 9/025; H01G 9/15; H01G 9/028; H01G 9/0029; H01G 9/0036; B05D 7/544
USPC .......................... 361/523, 526, 524, 529, 530
See application file for complete search history.

(56) References Cited

U.S. PATENT DOCUMENTS

| 2006/0084237 A1* | 4/2006 | Kobayashi ............. H01G 9/028 438/381 |
| 2015/0170844 A1* | 6/2015 | Vilc ..................... H01G 9/0036 361/525 |

FOREIGN PATENT DOCUMENTS

JP           2010267778 A   * 11/2010

* cited by examiner

*Primary Examiner* — Arun Ramaswamy
(74) *Attorney, Agent, or Firm* — Li & Cai Intellectual Property (USA) Office

(57) ABSTRACT

The instant invention provides a capacitor package structure having a functional coating and the method for manufacturing the same. The method includes coating a silane coupling agent with a general formula of $Y(CH_2)_n SiX_3$ on a capacitor element for forming the functional coating, in which X can be a same or different substituents and is selected from the group consisting of chloride, methoxy group, ethoxy group, methoxyethoxy group and acetoxy group, Y is a vinyl group, an amino group, an epoxy group, a methacryloyloxy group, a thiol group, a uramino group or an isobutyl group; and coating a conductive dispersion on the functional coating for enabling a polymer composite material in the functional coating to be connected to the surface of the capacitor element through the silane coupling agent.

8 Claims, 3 Drawing Sheets

CAPACITOR PACKAGE STRUCTURE WITH FUNCTIONAL COATING AND METHOD FOR MANUFACTURING THE SAME

BACKGROUND

1. Technical Field

The instant disclosure relates to a capacitor package structure and a method for manufacturing the same, in particular, to a capacitor package structure with a functional coating and a method for manufacturing the same.

2. Description of Related Art

Capacitors are widely used in consumer appliances, computers, power supplies, communication products and vehicles, and hence, are important elements for electronic devices. The main effects of capacitors are filtering, bypassing, rectification, coupling, decoupling and phase inverting, etc. Based on different materials and uses thereof, capacitors can be categorized into aluminum electrolytic capacitors, tantalum electrolytic capacitors, laminated ceramic capacitors and thin film capacitors. In the existing art, solid electrolytic capacitors have the advantages of small size, large capacitance and excellent frequency property and can be used in the decoupling of power circuits of central processing units. Solid electrolytic capacitors use solid electrolytes instead of liquid electrolytic solutions as cathodes. Conductive polymers are suitable for the cathode material of the capacitors due to its high conductivity, and the manufacturing process using conductive polymers are simple and low cost.

Conductive polymers suitable for cathodes of solid-type capacitors include polyaniline (PAni), polypyrrole (PPy), polythiophene (PTh) and the derivatives thereof. Among others, PEDOT:PSS (poly(3,4-ethylenedioxythiophene)-poly(styrenesulfonate)) composite has excellent conductivity and relatively low polymerization rate compared to other polymers such as PAni and PPy. Therefore, PEDOT:PSS composite can be easily prepared by a polymerization process under room temperature. In addition, PEDOT:PSS composite has better weather resistance and heat resistance compared to other polymers. The advantages of PEDOT:PSS further includes good dispersibility, low manufacturing cost, high transparency and excellent processability. Therefore, employing the PEDOT:PSS composite as a component of the conductive polymer layer on the cathode of capacitors is benefit to the improvement of the electrical properties of the capacitor.

SUMMARY

The main object of the instant disclosure is to provide a capacitor package structure having a functional coating and a method for manufacturing the same. The functional coating formed before the formation of the conductive polymer coating can increase the adhesion between the conductive polymer coating and the capacitor element.

An embodiment of the instant disclosure provides a method for manufacturing a capacitor package structure having a functional coating comprising a preparing step, a first coating step, a first drying step, a second coating step and a second drying step. The preparing step includes preparing a surface treating solution including a silane coupling agent and a solvent. The silane coupling agent has a general formula of $Y(CH_2)_nSiX_3$, in which n is an integer of 0 to 3, X is same or different substituent selected from the group consisting of: chloride, methoxy group, ethoxy group, methoxyethoxy group and acetoxy group, and Y is a vinyl group, an amino group, an epoxy group, a methacryloyloxy group, a thiol group, a uramino group or an isobutyl group. The first coating step includes coating the surface treating solution onto a capacitor element. The surface treating solution is disposed on a surface of the capacitor element and a part of the surface treating solution enters a plurality of voids of the capacitor element. The first drying step includes drying the surface treating solution for forming the functional coating. The second coating step includes coating a conductive dispersion onto the functional coating. The second drying step includes drying the conductive dispersion for forming a conductive polymer layer. A conductive polymer in the conductive polymer layer is connected to the surface of the capacitor element through the silane coupling agent in the functional coating.

Another embodiment of the instant disclosure provides a capacitor package structure including a capacitor element which includes a functional coating disposed on a surface thereon and a conductive polymer layer disposed on the functional coating. A conductive polymer composite material in the conductive polymer layer is connected to the surface of the capacitor element through a silane coupling agent in the functional coating. The silane coupling agent has a general formula of $Y(CH_2)_nSiX_3$, in which n is an integer of 0 to 3, X is same or different substituent selected from the group consisting of: chloride, methoxy group, ethoxy group, methoxyethoxy group and acetoxy group, and Y is a vinyl group, an amino group, an epoxy group, a methacryloyloxy group, a thiol group, a uramino group or an isobutyl group.

Yet another embodiment of the instant disclosure provides a method for manufacturing a capacitor package structure having a functional coating comprising a first coating step, a first drying step, a second coating step and a second drying step. The details of these steps are similar to that described above. However, in this embodiment, the first coating step is performed after the preparing step; the first drying step is performed after the first coating step; the second coating step is performed after the first drying step; and the second drying step is performed after the second coating step.

The advantage of the instant disclosure resides in that the capacitor package structure with a functional coating and a method for manufacturing the same provided by the embodiments of the instant disclosure can increase the adhesion between the polymer composite material and the surface of the capacitor element and the performance of the capacitor package structure formed therefrom by the means of using the functional coating with a silane coupling agent of a specific general formula. The silane coupling agent can be used to generate connection between the polymer composite material in the conductive polymer layer disposed on the functional coating and the surface of the capacitor element.

In order to further understand the techniques, means and effects of the instant disclosure, the following detailed descriptions and appended drawings are hereby referred to, such that, and through which, the purposes, features and aspects of the instant disclosure can be thoroughly and concretely appreciated; however, the appended drawings are merely provided for reference and illustration, without any intention to be used for limiting the instant disclosure.

BRIEF DESCRIPTION OF THE DRAWINGS

The accompanying drawings are included to provide a further understanding of the instant disclosure, and are incorporated in and constitute a part of this specification. The drawings illustrate exemplary embodiments of the instant disclosure and, together with the description, serve to explain the principles of the instant disclosure.

DESCRIPTION OF THE EXEMPLARY EMBODIMENTS

Figure 1:
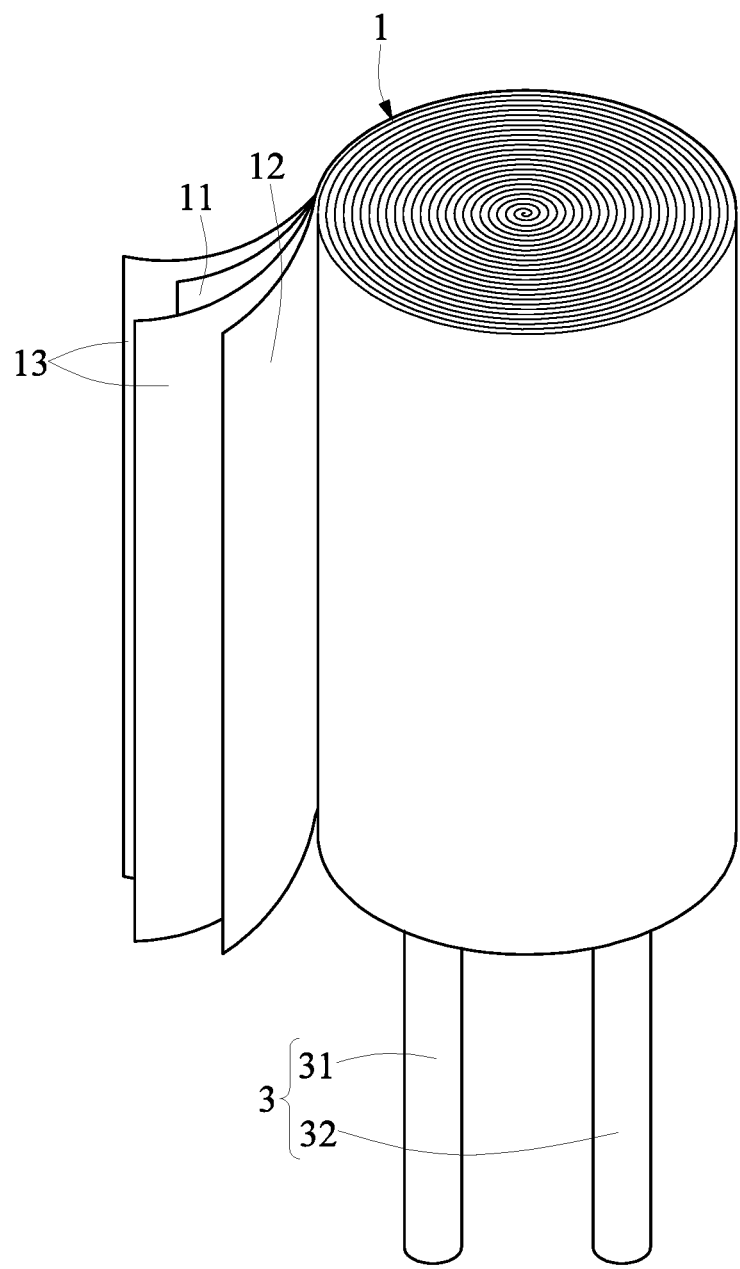
FIG. 1 is a sectional schematic view of a capacitor package structure having a functional coating provided by an embodiment of the instant disclosure.

Reference will now be made in detail to the exemplary embodiments of the instant disclosure, examples of which are illustrated in the accompanying drawings. Wherever possible, the same reference numbers are used in the drawings and the description to refer to the same or like parts.

Figure 2:
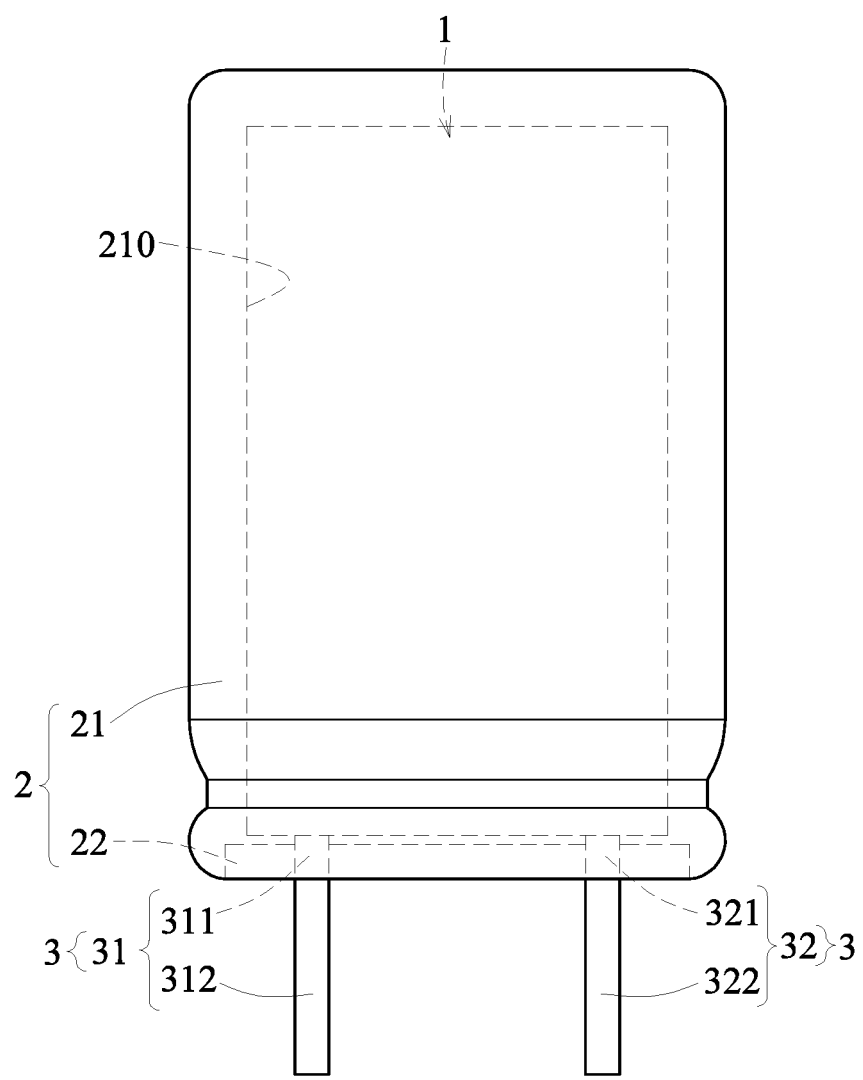
FIG. 2 is a sectional schematic view of a capacitor element of the capacitor package structure having a functional coating provided by the embodiment of the instant disclosure.

Reference is made to FIG. 1 and FIG. 2. FIG. 1 is a sectional schematic view of a capacitor package structure having a functional coating provided by an embodiment of the instant disclosure, and FIG. 2 is a sectional schematic view of a capacitor element of the capacitor package structure having a functional coating provided by the embodiment of the instant disclosure. As shown in FIG. 1, the capacitor package structure having a functional coating provided by the embodiment of the instant disclosure is a winding-type solid electrolyte capacitor package structure P.

As shown in FIG. 1, the winding-type solid electrolyte capacitor package structure P includes a winding-type component 1, a packaging component 2 and a conductive component 3. The winding-type component 1 and the conductive component 3 together form the capacitor element E used in the instant disclosure. The winding-type component 1 includes a winding-type positive conductive foil 11, a winding-type negative conductive foil 12 and two winding-type isolating foils 13. Furthermore, one of the two winding-type isolating foils 13 can be disposed between the winding-type positive conductive foil 11 and the winding-type negative conductive foil 12, and one of the winding-type positive conductive foil 11 and the winding-type negative conductive foil 12 can be disposed between the two winding-type isolating foils 13. In the embodiments of the instant disclosure the winding-type isolating foils 13 can include paper foil as a substrate, and have the functional coating and the conductive polymer layer disposed on the surface thereof.

As shown in FIG. 2, the winding-type component 1 can be enclosed in the packaging component 2. For example, the packaging component 2 includes a capacitor casing structure 21 (such as an aluminum casing or casing made of other metals) and a bottom end sealing structure 22. The capacitor casing structure 21 has an accommodating space 210 for accommodating the winding-type component 1, and the bottom end sealing structure 22 is disposed at the bottom end of the capacitor casing structure 21 for sealing the accommodating space 210. In addition, the packaging component 2 can be a packaging body made of any insulating materials.

The conductive component 3 includes a first conductive pin 31 electrically contacting with the winding-type positive conductive foil 11 and a second conductive pin 32 electrically contacting the second conductive pin 32. For example, the first conductive pin 31 has a first embedded portion 311 enclosed in the packaging component 2 and a first exposed portion 312 exposed from the packaging component 2. The second conductive pin 32 has a second embedded portion 321 enclosed in the packaging component 2 and a second exposed portion 322 exposed from the packaging component 2.

Figure 3:
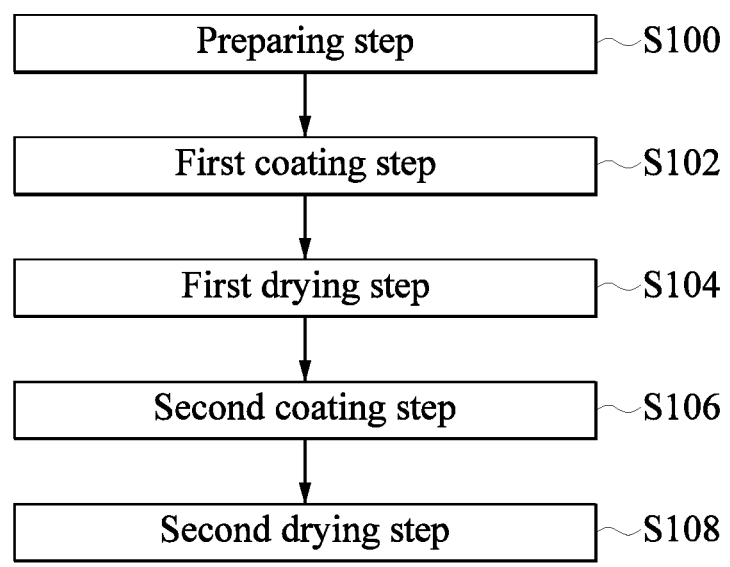
FIG. 3 is a flow chart of the method for manufacturing a capacitor package structure having a functional coating provided by the embodiment of the instant disclosure.

Reference is made to FIG. 3. FIG. 3 is a flow chart of the method for manufacturing a capacitor package structure having a functional coating provided by the embodiments of the instant disclosure. Specifically, the method includes a preparing step (step S100), a first coating step (step S102), a first drying step (step S104), a second coating step (step S106) and a second drying step (S108). In other words, the method provided by the embodiments of the instant disclosure include the steps related to treating the surface of the capacitor element (the preparing step, the first coating step and the first drying step) and the steps related to forming a conductive polymer layer on the treated surface of the capacitor element (the second coating step and the second drying step).

The preparing step includes preparing a surface treating solution including a silane coupling agent and a solvent. The silane coupling agent has a general formula of $Y(CH_2)_nSiX_3$, in which n is an integer of 0 to 3, X is same or different substituent selected from the group consisting of: chloride, methoxy group, ethoxy group, methoxyethoxy group and acetoxy group, and Y is a vinyl group, an amino group, an epoxy group, a methacryloyloxy group, a thiol group, a uramino group or an isobutyl group.

Specifically, the X group in the general formula of the silane coupling agent can be a hydrolysable functional group, and the Y group is an organic functional group. The X group can react and bond with inorganic materials such as conductive aluminum foils, titanium foils, carbon foils or non-conductive aluminum oxide foils, and the Y group can bond or interact with organic materials such as resin. Therefore, the silane coupling agent can create molecular bridges between inorganic and organic compounds, thereby linking the two types of materials.

In the instant disclosure, the solvent can be water or an alcohol. The solvent can enable the silane coupling agent to be well-dispersed in the surface treating solution. The surface treating solution can include 0.1 to 50 wt. % of the silane coupling agent and the remainder is the solvent. Preferably, the surface treating solution includes 0.1 to 10 wt. % of the silane coupling agent and the remainder is the solvent. Most preferably, the surface treating solution includes 1 to 5 wt. % of the silane coupling agent and the remainder is the solvent. If the content of the silane coupling agent is less than 0.1 wt. %, the amount thereof is insufficient to generate the connection (bonding) between the inorganic and organic materials, and if the content of the silane coupling agent is more than 50 wt. %, the electrical properties of the conductive polymer layer formed subsequently may be detrimental affected. Specifically, if the content of the silane coupling agent in the surface treating solution is too high, the resistivity of the capacitor may increase, and the capacitance of the capacitor may decrease.

In the first coating step, the surface treating solution is coated on the capacitor element. The surface treating solution is disposed on the surface of the capacitor element and a part of the surface treating solution enters the plurality of voids of the capacitor element. Specifically, the surface treating solution can be coated onto the capacitor element by immersion coating, spin coating, curtain coating or spray coating. In the instant disclosure, the process for coating the surface treating solution is not limited. Preferably, the capacitor element can be immersed into a vessel containing the surface treating solution for coating the surface treating solution on the surface of the capacitor element and enabling a part of the surface treating solution to enter the voids of the capacitor element. The plurality of voids of the capacitor element can be defects formed during the manufacturing process of the winding-type isolating foil 13.

For example, the time of the first coating step is from 30 seconds to 120 minutes. In fact, the time of the first coating step can be determined by the intended performance of the functional coating to be formed and the requirements of the product. In addition, the first coating step can be performed under a temperature ranging from 0 to 100° C. Generally, the first coating step is performed under room temperature and an additional heating device is not required.

Next, in order to remove the solvent in the surface treating solution disposed on the capacitor element, the first drying step (step S104) is performed. The first drying step includes drying (baking) the surface treating solution for forming the functional coating. In other words, in the first drying step, the solvent in the surface treating solution are removed and the silane coupling agent in the surface treating solution reacts with the material of the capacitor element, thereby forming the functional coating disposed on the capacitor element.

For example, the first drying step can be performed under a temperature ranging from room temperature (such as from 20 to 25° C.) to 200° C. In addition, the first drying step can include using a heating device for heating the surface treating solution, or irradiating the surface treating solution for removing the solvent.

Based on the above steps, the surface of the capacitor element is treated, i.e., the surface of the capacitor element has the function coating disposed thereon. In addition, a part of the functional coating is disposed (located) in the plurality of voids of the capacitor element. Next, in order to obtain a capacitor package structure with intended electrical properties, a conductive polymer layer is disposed on the capacitor element.

Specifically, in the second coating step (step S106), a conductive dispersion is coated onto the functional coating. The conductive dispersion includes a polymer composite material, an additive and a solvent. For example, the polymer composite material is PEDOT:PSS composite. For example, the additive is an emulsifier or a nano material. The addition of the emulsifier or the nano material such as carbon nano material can improve the dispersibility of the polymer composite material in the conductive dispersion. In addition, the solvent can be water or an organic solvent such as ethanol.

In an implementation of the instant disclosure, the polymer composite material is PEDOT:PSS composite having a surface modified by carbon nano material. In addition, the polymer composite material can have a D50 average particle size ranging from 1 to 25 nanometers.

Similar to the first coating step, the conductive dispersion can be coated on the functional coating by immersion coating, spin coating, curtain coating or spray coating. In the instant disclosure, the process for coating the conductive dispersion is not limited. Preferably, the capacitor element with the functional coating can be immersed into a vessel containing the conductive dispersion for coating the conductive dispersion on the surface of the functional coating.

Next, the second drying step (step S108) includes drying the conductive dispersion for forming a conductive polymer layer. Specifically, the second drying step is for removing the solvent in the conductive dispersion disposed on the functional coating, and enabling the generation of bonding (interaction) between the polymer composite material in the conductive polymer layer and the silane coupling agent in the functional coating.

For example, the second drying step can be performed under a temperature ranging from the room temperature (for example from 20 to 25° C.) to 200° C. In addition, the second drying step can include using a heating device for heating the conductive dispersion, or irradiating the conductive dispersion for removing the solvent. In addition, during the formation of the conductive polymer layer, the polymer composite material (such as PEDOT:PSS composite) bonds with the Y group of the silane coupling agent. Therefore, the polymer composite material in the conductive polymer layer can be connected to the surface of capacitor element through the silane coupling agent in the functional coating.

In the method for manufacturing the capacitor package structure having the functional coating provided by the instant disclosure, after the formation of the functional coating and the conductive polymer layer, a step for forming a package body can be further included. Reference is made to FIG. 2. The capacitor element with the functional coating and the conductive polymer layer (the winding-type component 1 shown in FIG. 2) is enclosed in the package body (the package component 2).

Next, in the method provided by the instant disclosure, after the formation of the functional coating and the conductive polymer layer and before the formation of the package body, a washing step can be further included. The washing step includes washing the functional coating and the conductive polymer layer by water or an alcohol for removing impurities such as small molecules or pollutions remained in the functional coating and the conductive polymer layer. Therefore, the equivalent series resistance of the capacitor manufactured therefrom can be reduced.

In addition, the instant disclosure further provides a capacitor package structure having a functional coating. The method for manufacturing the capacitor package structure is described above. The capacitor package structure includes at least a capacitor element, and the surface of the capacitor element includes the functional coating and a conductive polymer layer disposed on the function coating. The structure of the capacitor element, the components and ratio thereof in the functional coating and the components and ratio thereof in the conductive polymer layer are similar to that described above and are not reiterated herein.

In the capacitor package structure having the functional coating provided by the instant disclosure, the polymer composite material in the conductive polymer layer can be connected to the surface of the capacitor element through the silane coupling agent in the functional coating. Therefore, by employing the functional coating between the surface of the capacitor element and the conductive polymer layer, the adhesion between the polymer composite material and the capacitor element can be increased, thereby increasing the overall electrical properties of the capacitor package structure including the capacitor element.

For example, Table 1 below shows the comparison of the electrical properties between the capacitor package structure manufactured by the method provided by the instant disclosure (Example 1 and Example 2) and a capacitor package structure without the functional coating (Comparative Example 1 and Comparative Example 2). Specifically, Example 1 and Example 2 are the testing results of the capacitor manufactured by the method including step S100, step S102, step S104, step S106 and step S108, and Comparative Example 1 and Comparative Example 2 are the testing results of the capacitor formed by a method without step S102 and step S104.

TABLE 1

|  | capacitance (μF) | dissipation factor (D.F.) (%) | Equivalent series resistance (E.S.R.) (mΩ) | current leakage (μA) | number of short circuit occurred per 10 capacitors | number of open circuit occurred per 10 capacitors |
| --- | --- | --- | --- | --- | --- | --- |
| Example 1 | 51.8 | 2.8 | 20.5 | 13.8 | 0 | 0 |
| Example 2 | 49.5 | 1.9 | 12.6 | 22.3 | 0 | 0 |
| Comparative Example 1 | 52.2 | 2.6 | 19.9 | 50.6 | 2 | 2 |
| Comparative Example 2 | 50.3 | 1.7 | 12.9 | 226.0 | not applicable | not applicable |

As shown in the Table 1 above, comparing to the capacitor package element without functional coating (Comparative Examples), the capacitor package element of the example has lower current leakage and open or short circuit is not likely to occur.

In addition, in Example 3 listed in the following Table 2, the capacitor is formed by a method including a washing step additional to step S100, step S102, step S104, step S106 and step S108. Comparative Example 3 is a capacitor formed by a method without step S102 and step 104, i.e., a capacitor without a functional coating.

TABLE 2

|  | capacitance (μF) | dissipation factor (D.F.) (%) | Equivalent series resistance (E.S.R.) (mΩ) | current leakage (μA) |
| --- | --- | --- | --- | --- |
| Example 3 | 49.5 | 1.9 | 11.5 | 22.3 |
| Comparative Example 3 | 50.3 | 1.7 | 11.1 | 226.0 |

As shown in Table 2, comparing to the capacitor package structure of Comparative Example 3, the capacitor package structure of Example 3 has lower current leakage. In addition, comparing to Example 1 and Example 2 which are manufactured by a method without the washing step, Example 3 shows lower equivalent series resistance.

Effectiveness of the Embodiments

The advantage of the instant disclosure resides in that the capacitor package structure P with a functional coating and a method for manufacturing the same provided by the embodiments of the instant disclosure can increase the adhesion between the polymer composite material and the surface of the capacitor element and the performance of the capacitor package structure formed therefrom by the means of using the functional coating with a silane coupling agent of a specific general formula. The silane coupling agent can be used to generate connection between the polymer composite material in the conductive polymer layer disposed on the functional coating and the surface of the capacitor element.

The above-mentioned descriptions represent merely the exemplary embodiment of the present disclosure, without any intention to limit the scope of the instant disclosure thereto. Various equivalent changes, alterations or modifications based on the claims of the instant disclosure are all consequently viewed as being embraced by the scope of the instant disclosure.

What is claimed is:

1. A method for manufacturing a capacitor package structure having a functional coating, comprising:

a preparing step including preparing a surface treating solution including a silane coupling agent and a solvent, wherein the silane coupling agent has a general formula of $Y(CH_2)_nSiX_3$, wherein n is an integer of 0 to 3, X is same or different substituent selected from the group consisting of: chloride, methoxy group, ethoxy group, methoxyethoxy group and acetoxy group, and Y is a vinyl group, an amino group, an epoxy group, a methacryloyloxy group, a thiol group, a uramino group or an isobutyl group;

a first coating step including coating the surface treating solution onto a capacitor element, wherein the surface treating solution is disposed on a surface of the capacitor element and a part of the surface treating solution enters a plurality of voids of the capacitor element;

a first drying step including drying the surface treating solution for forming the functional coating;

a second coating step including coating a conductive dispersion onto the functional coating; wherein the conductive dispersion includes a polymer composite material; the polymer composite material is PEDOT:PSS composite having a surface modified by carbon nano material; and the polymer composite material has a D50 average particle size ranging from 1 to 25 nanometers; and a second drying step including drying the conductive dispersion for forming a conductive polymer layer, wherein a conductive polymer in the conductive polymer layer is connected to the surface of the capacitor element through the silane coupling agent in the functional coating.

2. The method according to claim 1, wherein the surface treating solution includes 0.1 to 50 wt. % of the silane coupling agent, and the remainder is the solvent.

3. The method according to claim 1, wherein the surface treating solution includes 0.1 to 10 wt. % of the silane coupling agent, and the remainder is the solvent.

4. The method according to claim 1, wherein after the second drying step, further including a washing step for washing the functional coating and the conductive polymer layer by water or an alcohol.

5. The method according to claim 1, wherein the first coating step is performed for a time ranging from 30 seconds to 120 minutes.

6. The method according to claim 1, wherein the first coating step is performed under a temperature ranging from 0 to 100° C.

7. The method according to claim 1, wherein the first drying step is performed under a temperature ranging from 20 to 200° C.

8. A method for manufacturing a capacitor package structure having a functional coating, comprising:

a preparing step including preparing a surface treating solution including a silane coupling agent and a solvent, wherein the silane coupling agent has a general formula of $Y(CH_2)_nSiX_3$, wherein n is an integer of 0 to 3, X is same or different substituent selected from the group consisting of: chloride, methoxy group, ethoxy group, methoxyethoxy group and acetoxy group, and Y is a vinyl group, an amino group, an epoxy group, a methacryloyloxy group, a thiol group, a uramino group or an isobutyl group;

performing a first coating step after the preparing step, including: coating the surface treating solution onto a capacitor element, wherein the surface treating solution is disposed on a surface of the capacitor element and a part of the surface treating solution enters a plurality of voids of the capacitor element;

performing a first drying step after the first coating step, including: drying the surface treating solution for forming the functional coating;

performing a second coating step after the first drying step, including: coating a conductive dispersion onto the functional coating; wherein the conductive dispersion includes a polymer composite material; the polymer composite material is PEDOT:PSS composite having a surface modified by carbon nano material; and the polymer composite material has a D50 average particle size ranging from 1 to 25 nanometers; and performing a second drying step after the second coating step, including: drying the conductive dispersion for forming a conductive polymer layer, wherein a conductive polymer in the conductive polymer layer is connected to the surface of the capacitor element through the silane coupling agent in the functional coating.

* * * * *